Jan. 14, 1941.  W. L. HEALD  2,228,518
APPARATUS FOR TESTING DOUGH
Filed June 17, 1938
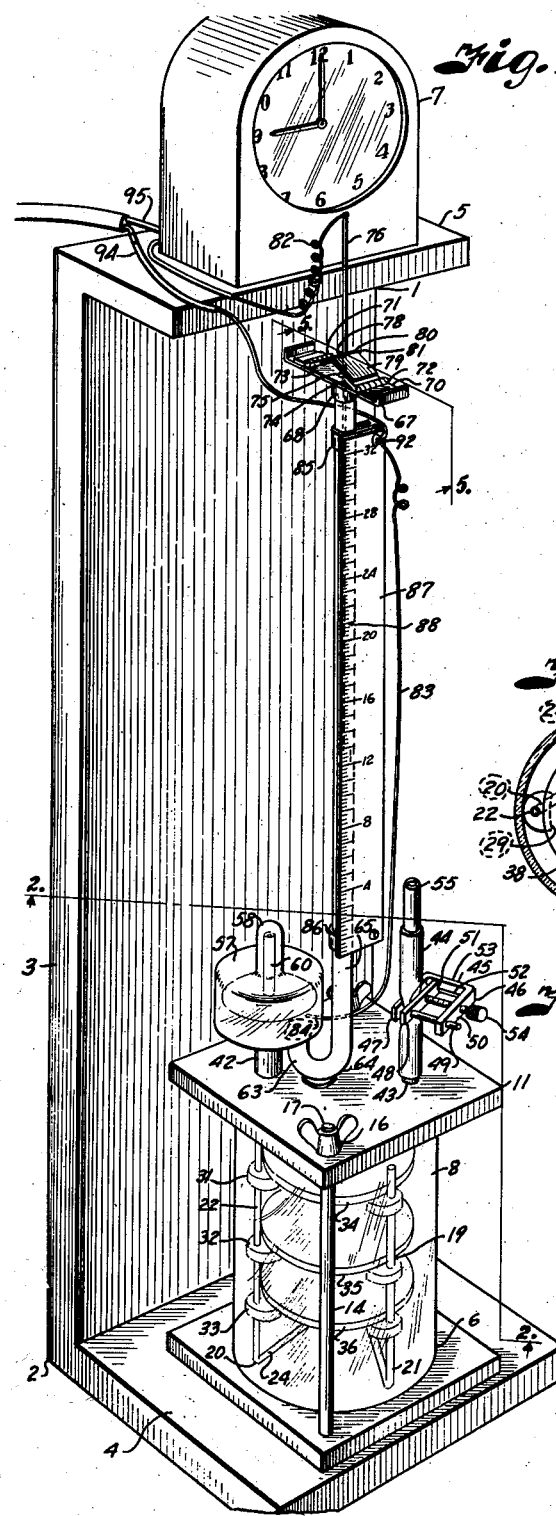
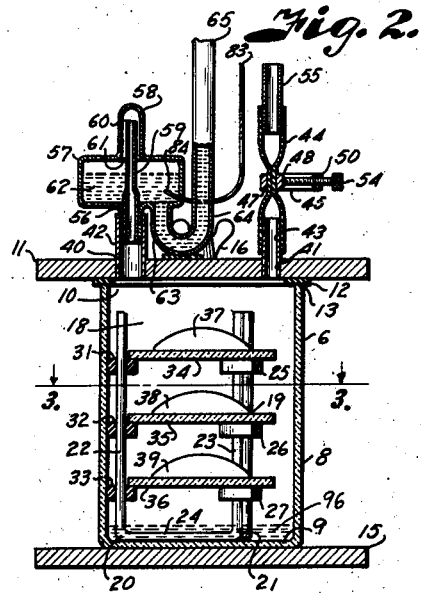
INVENTOR
William L. Heald.
BY
ATTORNEY Patented Jan. 14, 1941

2,228,518

UNITED STATES PATENT OFFICE 2,228,518

APPARATUS FOR TESTING DOUGH

William L. Heald, Kansas City, Mo., assignor of one-half to Flour Mills of America, Inc., Kansas City, Mo., a corporation of Maryland Application June 17, 1938, Serial No. 214,233

3 Claims. (Cl. 23—253)

This invention relates to an apparatus for testing dough and particularly for determining the critical maturing point of a dough batch so that the products baked therefrom will have the desired volume, appearance, quality and texture.

In the preparation of dough mixtures, yeast with its enzymes is introduced into a flour and liquid mixture to effect fermentation wherein quantities of carbon dioxide gas are generated and the hydrogen concentration of the mix is progressively increased to that productive of the desired physical characteristics for good bakery products characterized by volume relatively to a given weight of dough, size, and arrangement of cell structure, appearance, and keeping qualities. All of these characteristics are dependent upon the gas retention and liberating properties of the dough which in turn govern the physical changes brought about with the development and final attainment of a definite hydrogen ion concentration, humidity, and temperature of the surrounding air, and other factors.

It is, therefore, the principal objects of the present invention to provide an apparatus for accurately registering the time required for a dough mix to reach the critical maturity point; and to indicate the maximum pressure of the generated gas that is evolved during fermentation.

In accomplishing these objects, I have provided an improved apparatus, the preferred form of which is illustrated in the accompanying drawing, wherein:

Fig. 1 is a perspective view of a dough testing apparatus embodying the features of the present invention.

Fig. 2 is a section through a portion of the apparatus on the line 2—2 of Fig. 1.

Fig. 3 is a horizontal section through the gas generating vessel in which the dough samples are inserted, and taken on the line 3—3 of Fig. 2.

Fig. 4 is a detail perspective view of the rack for supporting the dough samples.

Fig. 5 is a vertical section on the line 5—5 of Fig. 1.

Fig. 6 is a horizontal section on the line 6—6 of Fig. 5.

Referring more in detail to the drawing:

1 designates a dough testing apparatus embodying the features of the present invention and which includes a support 2 comprising a vertical panel 3 having a laterally extending foot or base 4 at its lower end and a laterally extending shelf 5 at its upper end for respectively supporting a gas generating vessel 6 and a clock or timing device 7.

The gas generating vessel 6 includes a cylindrical cup-like member preferably formed of transparent material, such as glass, and having an annular wall 8, a closed bottom 9, and an open top 10 which is adapted to be closed by a cover plate 11. The cover plate 11 seats upon a gasket ring 12 which sealingly engages the rim 13 of the vessel and is clamped thereto by rods 14. The rods 14 are anchored in the corners of a base plate 15, at opposite diametrical sides of the vessel, and extend through openings in the corresponding corners of the cover plate to mount wing nuts 16 that are threaded on projecting ends 17 of the rods to engage against the upper surface of the plate, thereby firmly anchoring the vessel and sealing the open end thereof to form a gas-tight compartment.

Removably mounted in the vessel is a rack 19 comprising a pair of substantially U-shaped bars 20 and 21, each having vertical legs 22 and 23 connected by cross bars 24. The legs 23 are interconnected by spaced blocks 25, 26 and 27, so that the cross bars 24 form a substantially equilateral triangular base adapted to rest upon the bottom 9 of the vessel. The blocks 25, 26 and 27 include inwardly projecting arcuate portions 28 cooperating with similar arcuate portions 29 and 30 on sets of correspondingly spaced blocks 31, 32 and 33 on the legs 22. The arcuate-shaped projections thus form shoulders for supporting disks 34, 35 and 36 on which samples of dough 37, 38 and 39 are placed, as clearly shown in Fig. 2.

The cover plate 11 is provided with openings 40 and 41 preferably positioned on a diagonal transversely to the diagonal of the clamping rods to mount nipples 42 and 43 that are sealed within the respective openings. Sleeved over the nipple 43 is a flexible tube 44 which is preferably formed of rubber or similar material, and which is provided with a clamp 45 that is adapted to pinch the walls of the tube together and close the passage therethrough.

In the illustrated instance the clamp includes a U-shaped member 46 forming a fixed clamping jaw 47 engaging one side of the tube and cooperating with a movable clamping jaw 48 engaging the other side of the tube. The movable clamping jaw is guidingly supported at its outer end on a pin 49 that is slidable in the leg 50 of the U-shaped member while its opposite end is provided with a V-shaped notch 51 guidingly engaging a similarly shaped rib 52 on the connecting bar portion 53 of the clamping member. The movable clamping jaw is actuated by an adjusting screw 54 threadedly mounted in an opening of the arm 50 and having its shank bearing against the movable clamping jaw, as shown in Figs. 1 and 2. The outer end of the tube 44 may be provided with a rigid section of tube 55.

Tightly sleeved within the open end of the tube 42 is a depending tubular neck 56 of an enclosed chamber 57, having a reduced upward extension or dome 58. Tightly engaged within the neck 56 is a tube 59 having a reduced upper portion 60 terminating within the dome 58 and which is of smaller diameter to provide a gas passageway 61 therebetween. The tube 59 thus cooperates with the outer wall of the chamber 57 to form an annular space for retaining a body of pressure actuated fluid 62, such as mercury, or similar liquid capable of carrying an electric circuit. Connected with the bottom of the chamber is a short leg 63 of a U-tube 64 having a long leg or liquid conducting column 65 extending upwardly of the panel 3 but terminating short of the shelf as shown in Fig. 1. The interior of the tube therefore connects with the pressure chamber and is filled with liquid up to the level of the liquid contained therein. The upper end of the long leg 65 carries a head 66 including a flat metal plate 67, having a depending collar 68 rigidly engaging over the upper end of the tube.

Fixed to the upper surface of the plate are the leaves 70 of hinges 71 and 72, having loose leaves 73 and 74 extending for free swinging movement in the axial direction of the tube 65. The plate 67 has an opening 75 registering with the axis of the tube 65 and slidable therethrough is a wire-like rod 76 carrying a float 77 on the lower end thereof which is adapted to float upon the body of liquid contained in the tube, as shown in Fig. 5. When the float is formed of insulating material the wire-like rod extends completely through the float to make contact with the liquid as shown. The rod is of sufficient length so that when there is no pressure acting upon the surface of the liquid in the chamber 57, the upper end of the rod projects a material distance through the opening 75. Fixed to the free leaves of the hinges are relatively thin metal blades 78 and 79 having free edges 80 and 81 engaging the opposite sides of the rod at such an angle that the rod is supported thereby against downward movement within the tube 65, but is adapted for free upward movement within the tube when the liquid rises therein. Connected with the upper end of the rod is a flexible conductor 82 that forms one side of an electrical circuit, the other side of which is formed by a conductor 83 having an end 84 thereof sealingly projected through a wall of the chamber 57 to contact with the mercury therein.

Fixed to the tube 65, by clamps 85 and 86, is a scale 87 having graduations 88 thereon, to indicate pressures within the pressure generating chamber. The clamps 85 and 86 are best illustrated in Fig. 6 and are shown as comprising strips 89 bent around the tube and having free ends 90 and 91 that are drawn tightly around the tube by fastening devices 92 extending through openings in the scale and through aligning openings in the ends 90 and 91 and having nuts 93 that are drawn taut against the ends 90 of the clamps.

The clock 7 is preferably of the electro-synchronous type and is supplied with an energizing current through conductors 94 and 95, the conductor 94 being connected with the conductor 83 so that circuit is completed from the conductor 94 through the conductor 83, mercury 62, rod 76 and conductor 82 to the clock mechanism whenever the rod 76 is contacting with the mercury. Therefore the clock continues to operate as long as the mercury stands at a sufficient height within the tube 65 to engage the portion of the rod depending from the float 77. Should the level of mercury drop in the tube the gripping plates 78 and 79 prevent following movement of the float and current is therefore interrupted to stop operation of the clock.

In using the apparatus constructed and assembled as described, samples are taken from the dough batch to be tested, a plurality of samples being taken for the reason that it is difficult to obtain a single sample that is directly representative of the gas retaining properties of the entire batch, owing to variation in surface extent of the sample in proportion to its weight relatively to the main batch of dough, slight crusting over of the samples, or variation in the cell structures in different parts of the batch. When a plurality of samples are taken under as nearly the same conditions as possible and the mean results are obtained, they are considered representative of the entire dough batch.

In the apparatus illustrated three samples are taken which are of equal weight and of as nearly the same shape and texture as possible, and placed upon the respective disks 34, 35 and 36. The disks are then placed in the rack 19 and the loaded rack is inserted in the vessel 8. The gasket ring 12 is then applied to the rim of the vessel and covered by the plate 11 which carries the respective fittings necessary in determining the pressure of the gas generated. The plate is tightened in sealing contact with the vessel by the wing nut 16. For the sake of accuracy the apparatus should be located in a zone of constant temperature, such as a cabinet (not shown). In order to accurately determine the pressure of the retained gas it is necessary to effect maturing of the dough in air having substantially eighty per cent humidity, and to maintain this humidity an aqueous solution 96 is placed within the bottom of the vessel 8. It is also necessary that the liquid be of a character to effect absorption of the evolved gas. For this purpose I use a twenty-five per cent solution of potassium hydroxide, as it not only maintains the desired humidity but also effectively dissolves the liberated gas. The clamp 45 is then adjusted to collapse the vent tube 44. Circuit is closed to the electric clock 7 by raising the gripping leaves 78 and 79 from contact with the rod 76 so that the rod drops to the point where the float 77 rests upon the body of mercury within the tube. Circuit is then completed through the electric clock by way of the mercury and the wire-like rod to effect actuation of the clock. As the dough samples mature, gas is evolved within the vessel 8, which passes through the tube 59 and acts on the surface of the mercury within the chamber 57 to effect displacement thereof through the legs 63 and 65 of the measuring tube. As the pressure increases, the float rises in the tube to the point where maximum pressure is evolved. As fermentation progresses the rate of gas generation begins to decline so that absorption of gas by the solution 96 is greater than the amount being generated. The critical maturing point of the dough has then been reached and the pressure begins to fall within the vessel due to the absorption of the gas. When this occurs the rod 76 will be supported by the gripping members 78 and 79 and the mercury will fall away from contact with the wire-like rod to break the electric circuit and stop operation of the clock.

The time that the clock has been in operation is the time required for the dough to reach the critical maturing point, and the position of the float relatively to the graduations on the scale indicates the maximum pressure of the gas evolved in the fermentation process. These figures may, therefore, be taken as corresponding to the time required for the main dough batch to reach the critical maturing point and the amount of gas that may be evolved. The main dough batch may, therefore, be altered by adding the proper ingredients to bring the maturing point to the desired value required in making good bakery products.

What I claim and desire to secure by Letters Patent is:

1. An apparatus of the character described including a closed vessel for containing a pressure generated within the vessel, an electrically actuated time mechanism for indicating time elapsing during a period of pressure generation in the vessel, a circuit for said mechanism, a current supply for said circuit, pressure responsive switch means in said circuit and having connection with the vessel for effecting opening of said circuit upon drop of pressure in the vessel, and means associated with said switch means for indicating maximum pressure attained in said vessel.

2. An apparatus of the character described including a closed vessel for containing a pressure generated within the vessel, a liquid containing chamber connected with the vessel, a liquid conducting tube connected with the chamber, a liquid contained in said chamber and tube and adapted to be transferred to and from the chamber and tube responsive to rise and fall of pressure in said vessel, circuit closing means in said tube movable upon rise and fall of liquid in the tube incidental to pressure drop in the vessel, an electrically actuated time mechanism, and an electrical circuit for said mechanism having connection with said circuit closing means to open the circuit responsive to fall of liquid in the tube.

3. An apparatus of the character described including a closed vessel for containing a pressure generated within the vessel, a liquid containing chamber connected with the vessel, a liquid conducting tube connected with the chamber, a liquid contained in said chamber and tube and adapted to be transferred to and from the chamber and tube responsive to rise and fall of pressure in said vessel, a float in said tube, a rod carried by the float, a clutch engageable with the rod to support the rod upon fall of liquid in the tube incidental to pressure drop in the vessel, an electrically actuated time mechanism, an electrical circuit for said mechanism having connection with said rod and the liquid in the tube whereby the circuit is broken responsive to support of the rod by said clutch upon fall of liquid in the tube, and a current supply for said circuit.

WILLIAM L. HEALD.